United States Patent [19]
Hoshino

[11] Patent Number: 6,092,329
[45] Date of Patent: Jul. 25, 2000

[54] PROTECTIVE FRUIT GROUP GROWING BAG

[75] Inventor: Tadashi Hoshino, Niigata, Japan

[73] Assignees: Arkay International Incorporated, Seattle, Wash.; Hoshino Yoshiten Company, Japan

[21] Appl. No.: 09/184,760

[22] Filed: Nov. 2, 1998

[51] Int. Cl.[7] .................................................. A01G 13/00
[52] U.S. Cl. .............................................................. 47/26
[58] Field of Search ............................... 47/26, 65.5, 65.8

[56] References Cited

U.S. PATENT DOCUMENTS

| | | | |
|---|---|---|---|
| 4,646,467 | 3/1987 | Morrisroe | 47/26 |
| 4,698,226 | 10/1987 | Guthrie | 47/26 |
| 5,406,746 | 4/1995 | Hoshino | 47/26 |
| 5,535,543 | 7/1996 | Alexander | 47/26 |
| 5,564,223 | 10/1996 | Takita | 47/26 |

FOREIGN PATENT DOCUMENTS

| | | | |
|---|---|---|---|
| 1234722 | 10/1986 | Japan | 47/26 |
| 1063321 | 3/1989 | Japan | 47/26 |

*Primary Examiner*—Thomas Price
*Attorney, Agent, or Firm*—Stratton Ballew PLLC

[57] ABSTRACT

An improved protective growing fruit bag is applied to fruit growing on a plant for protecting the fruit from disease, insects, birds and especially from sunburn caused by irradiation by sunlight. The bag has at least an inner bag, which is made of black wax paper and an outer bag, whose interior is black. The fruit bag provides sufficient light shielding until the bag removal time. When the fruit is sufficiently grown, the entire bag is removed in one step during daytime when the temperature inside the bag is sufficiently high, preventing sunburning of the fruit.

8 Claims, 2 Drawing Sheets

PROTECTIVE FRUIT GROUP GROWING BAG

TECHNICAL FIELD

The present invention relates to a protective bag for growing fruit, such as an apple. More specifically, the invention relates to an improved fruit growing protective bag which prevents sunburn on growing fruit.

BACKGROUND OF THE INVENTION

In growing apples, a young apple is enclosed with a bag which provides a light-shielded condition during its growing period, and, when the fruit is sufficiently grown, the bag is removed to expose the fruit to sunlight for the coloring of its surface. In removing the bag, sudden exposure to sunlight after the bag removal causes a so-called "sunburnt" surface of the fruit, reducing the commercial value of the fruit to zero. For this reason, the fruit bag has traditionally been constructed in a double-layer or occasionally as a triple-layer structure. When it is time to remove the bag, only the outer bag (and the intermediate bag in case of a triple bag structure) is removed initially. The fruit remains covered by the innermost bag which has a suitable light permeability rate for several days so that the fruit is gradually introduced to sunlight to prevent sunburning.

The paper used for the above-described double-layer and triple-layer constructed bags is given the additional role of protecting the fruit from insects and bacteria. Protecting the fruit from bacteria greatly reduces the deterioration of fruit and improves the texture of fruit. In particular, paper with black coating on the interior side is used for the outer bag and wax paper (paraffin paper) is used for the inner bag. The inner bag is colored with a suitable color to ensure a certain light permeability rate.

The use of multiple-layer constructed bags to prevent sunburning as described above always requires two separate bag removing operations, once for the outer bag or bags and then for the inner bag. Furthermore, such operations must be conducted totally manually for each fruit, resulting in a considerable burden on the apple farmer.

As a measure to solve the above-described problem, a method was introduced to adopt a double-bag structure consisting of an inner bag colored with a dye or a pigment which fades in sunlight and yet ensures a suitable light shielding rate, and an outer bag with the proper light shielding rate which will realize the inner bag's fading under sunlight throughout the bag-wearing period of a fruit so that only one bag removing operation will be required.

U.S. Pat. No. 5,406,746 teaches a protective bag applied to fruit growing on a plant for protecting the fruit from excessive irradiation by sunlight, disease, insects, and birds without the requirement of two separate bag removing operations. The bag is colored with a coloring agent which has a property to gradually lower its sunlight shielding characteristic in response to irradiation by sunlight. The method is not practical, however, because of the complexity of manufacturing such a bag, including the formulation of the pigment used for controlled fading. It has been found by the inventor of the '746 bag, which is the same inventor of the present invention, that the protective bag of '746 did not satisfactorily succeed in preventing sunburn. Although it is not completely understood, it appears that the degree of permeation of light and light shielding rate characteristic of the '746 bag is unsatisfactory in preventing sunburn to the fruit.

SUMMARY OF INVENTION

As a result of the discovery of a phenomenon peculiar to the sunburning of an apple, the present invention proposes a new fruit bag to combat sunburning.

The present invention relates to an improved fruit bag which ensures sufficient light shielding throughout the entire growing period of a fruit despite exposure to sunlight, winds or rain, and does not cause sunburning of a fruit even if the entire bag is removed at once so long as the proper timing of bag removal operation is selected. This reduces the prior two operations of bag removal to one, hence considerably lightening the burden on the part of an apple farmer. Also reduced or eliminated is the complexity of manufacturing such a bag, including the formulation of the pigment used for controlled fading.

The improved fruit bag of the present invention features certain material and coloring which enables the continuation of approximately 100% light shielding through the bag-wearing period of a fruit. The improved fruit bag utilizes black wax paper for the inner bag.

In use, a young fruit is enclosed with the improved fruit bag and is grown under a sufficiently shielded condition from light in contrast to prior double-bag and triple-bag structures which are aimed at gradual exposure to sunlight and have a light shielding rate which decreases by the time of bag removal, allowing sunlight, though weak, to irradiate the fruit. The fruit bag according to the present invention provides sufficient light shielding until the removal time, and, when the fruit is sufficiently grown, the entire bag is removed at once during daytime when the temperature inside the bag is sufficiently high. For reasons unknown, sunburning of the fruit does not occur.

In an embodiment, the present invention provides a method of preventing sunburn of growing fruit caused by irradiation by sunlight, comprising the steps of applying a protective multiple-layer constructed bag to a growing fruit, the protective multiple-bag constructed bag having an inner bag constructed from black wax paper and an outer bag whose interior is black; and removing the entire protective multiple-bag constructed bag in one step from the fruit when the fruit is sufficiently grown, during daytime when the temperature inside the protective bag is sufficiently high.

In view of the inconvenience and ineffectiveness of the prior art, it is an advantage of the present invention to provide an improved protective fruit growing bag.

Another advantage of the present invention is to provide a growing fruit bag which protects the fruit from negative weather conditions, bacteria and insects.

Another advantage of the present invention is to provide a growing fruit bag which improves the shelf life of fruit.

Still another advantage of the present invention is to provide a growing fruit bag which drastically reduces the deterioration of fruit.

Yet another advantage of the present invention is to provide a growing fruit bag which improves the texture of fruit.

Another advantage of the present invention is to provide a growing fruit bag which protects the fruit from sunburning.

Another advantage of the present invention is to provide a growing fruit bag which can be used in conjunction with imaging technology.

Another advantage of the present invention is to provide a growing fruit bag which is easier to manufacture.

Another advantage of the present invention is to provide a method of preventing sunburn of growing fruit caused by irradiation by sunlight.

Another advantage of the present invention is to provide a growing fruit bag which allows for the removal of the bag in one step.

These and other objects and advantages of the present invention will be apparent from the specification and the drawings.

DETAILED DESCRIPTION OF SPECIFIC EMBODIMENTS

Figure 3:
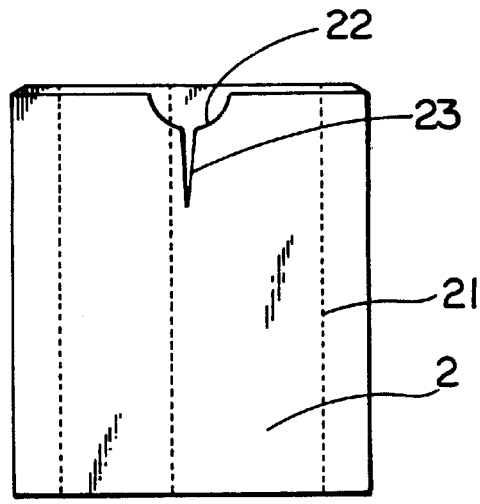
FIG. 3 is a front elevation view of a preferred embodiment of a double-bag protective growing fruit bag, illustrating the inner bag according to the present invention.
Figure 2:
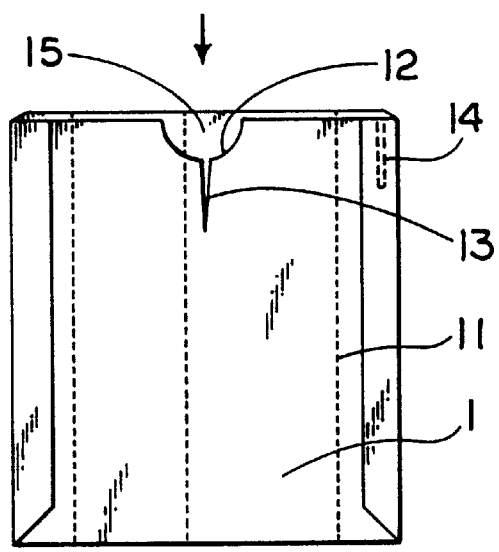
FIG. 2 is a front elevation view of a preferred embodiment of double-bag protective growing fruit bag, illustrating the outer bag according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated apparatus and method, and such further applications of the principles of the invention as illustrated therein being contemplated as would normally occur to one skilled in the art to which the invention relates.

Figure 1:
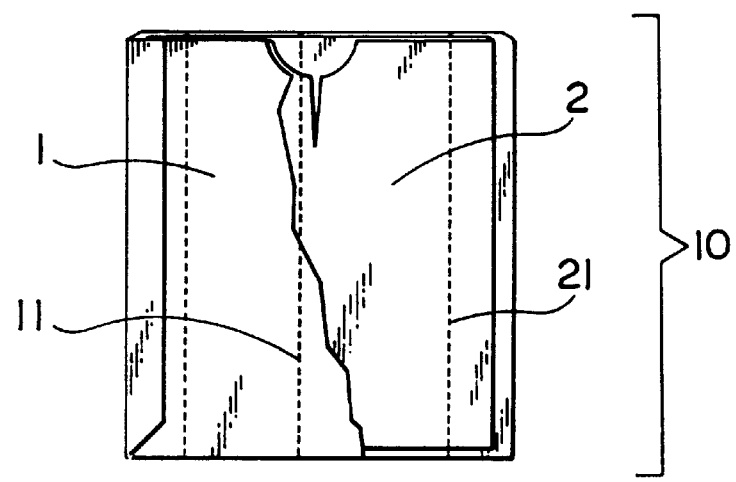
FIG. 1 is a front elevation view, partially broken open of a preferred embodiment of an improved double-bag constructed fruit bag of the present invention.

The preferred embodiment shown in FIG. 1 is double-bag constructed bag 10, consisting of an outer bag 1 and an inner bag 2. The outer bag 1 has black coating on the interior surface 15 for a sufficient light shielding rate. The outer bag has perforated lines 11. The inner bag 2 has perforated lines 21. The perforated lines make possible the removal of the bag from the fruit as a one step operation. The inner bag combined with the outer bag provide a completely opaque covering for the fruit inside. The outer bag 1 has a black coating (not shown) on the interior side 15 for a light shielding rate of over 90%, a perforated line 11 to help in the removal of the bag, an outer bag cut 12, a notch 13 to provide room for the stem of a fruit, and a piece of wire (not shown) embedded inside the glued portion 14 of the outer bag for winding and tying the bag around the fruit.

The inner bag 2 as shown in FIG. 3 has a generally cylindrical shape and is preferably made of black waxed paper which is translucent black as a result of waxing. Similar to the outer bag I described above, the inner bag 2 has a perforated line 21, an inner bag cut 22 and a notch 23 located at the same respective positions 11, 12 and 13 as the outer bag 1.

The above-described double bag constructed bag is applied to a young fruit 30–40 days after the natural drop of the bloom occurs to allow the entire bag to provide nearly complete light shielding from the time of bag application through the time of bag removal. A light shielding rate of approximately 90% is ensured throughout the growing period of the fruit. Both the outer bag 1 and the inner bag 2 are removed together at the time of bag removal. The bag removal operation must be conducted while the internal temperature of the bag is sufficiently high, i.e., during daytime when the external temperature and the internal temperature of the bag are approximately the same. The inventor has found that the preferred time for bag removal is approximately 10 days later than used for initial removal of conventional multiple bags. Through experimentation, the inventor has found that the most suitable time for bag removal is between 1:00 a.m. and 4:00 p.m. on a fine day. This method of bag removal does not cause sunburning even if the entire bag is removed at once. Mistiming of the bag removal may cause sunburning, however.

Figure 4:
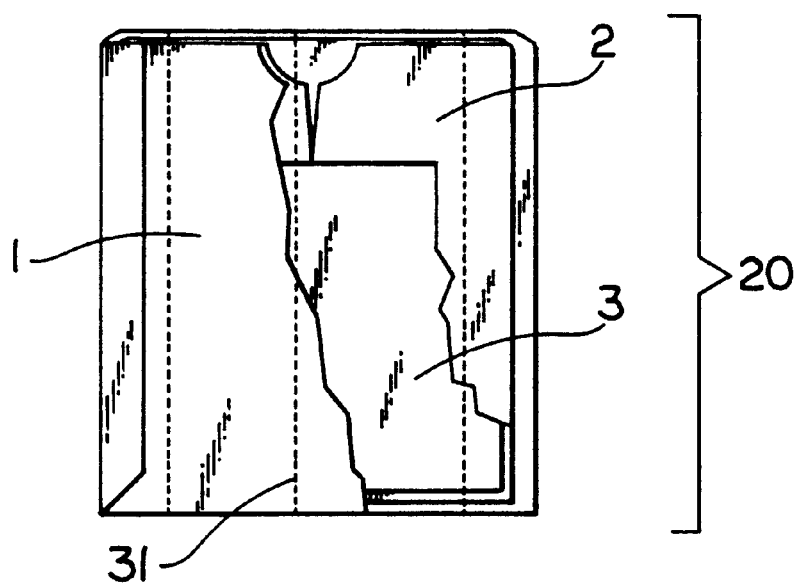
FIG. 4 is a front elevation view, partially broken open of a preferred embodiment of a triple-bag constructed fruit bag according to the present invention.

Alternatively, as shown in FIG. 4, the present invention can be embodied in a triple-bag constructed bag 20. The triple-bag constructed bag shown has an outer bag 1 and an inner bag 2, similar to the above-described double-bag constructed bag 10, and an additional intermediate bag 3, with the bottom folded in half, between the outer bag 1 and the inner bag 2. There is no specific requirement for the type of material to be used for the intermediate bag. Opaque black paper which turns translucent by waxing is most suitable for the intermediate bag. However, any material that will provide a sufficient light shielding rate of the entire bag during the growing period of a fruit is contemplated by the inventor. Perforated lines 31 on the intermediate bag are preferably placed at the same locations as those on the outer bag and the inner bag for easy removal of the entire bag.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set forth herein but to include all possible embodiments which can be embodied within the scope encompassed and equivalents thereof with respect to the features set out in the appended claims. CLAIMS

What is claimed is:

1. A fruit bag to be applied to fruit growing on a plant for providing complete sunburn prevention, at least 90% light shielding rate, and protection from insects, birds, disease and so forth, throughout the entire growing period of the fruit, the fruit bag comprising:

an outer bag having an interior surface and an exterior surface, the interior surface being black in color; and an inner bag, the inner bag being cylindrical in shape and constructed from black wax paper.

2. A method of preventing sunburn of growing fruit caused by irradiation by sunlight, the method comprising the steps of:

applying a protective multiple-bag constructed bag to young, individual growing fruit, the protective multiple-bag constructed bag having an inner bag constructed from black wax paper and an outer bag whose interior is black; and removing the entire protective multiple-bag constructed bag in one step from the fruit when the fruit is sufficiently grown, during daytime when the temperature inside the protective bag is sufficiently high.

3. The method of claim 2 wherein the fruit is an apple.

4. The method of claim 2 wherein the multiple-bag constructed bag is a double-bag construction.

5. The method of claim 2 wherein the multiple-bag constructed bag is a triple-bag construction.

6. A fruit bag to be applied to fruit growing on a plant for providing complete sunburn prevention, at least 90% light shielding rate, and protection from insects, birds, disease and so forth, throughout the entire growing period of the fruit, the fruit bag comprising:

an outer bag having an interior surface and an exterior surface;

an inner bag, the inner bag being constructed from black wax paper; and an intermediate bag located between the outer bag and the inner bag.

7. A fruit bag to be applied to fruit growing on a plant for providing complete sunburn prevention, at least 90% light shielding rate, and protection from insects, birds, disease and so forth, throughout the entire growing period of the fruit, the fruit bag comprising:

an outer bag having an interior side and an exterior side, the interior side of the outer bag having a black coating, the outer bag having a perforated line, a cut, a notch and a portion for receiving a piece of wire for winding and tying the fruit bag;

an inner bag, the inner bag being cylinder-shaped and constructed from black wax paper, the inner bag having a perforated line, a cut, a notch and a portion for receiving a piece of wire at substantially the same respective positions as the outer bag; and an intermediate bag located between the outer bag and the inner bag.

8. A fruit bag to be applied to fruit growing on a plant for providing complete sunburn prevention, at least 90% light shielding rate, and protection from insects, birds, disease and so forth, throughout the entire growing period of the fruit, the fruit bag comprising:

an outer bag having an interior surface and an exterior surface, the interior surface being black in color;

an inner bag, the inner bag being constructed from black wax paper; and an intermediate bag located between the outer bag and the inner bag.

* * * * *